United States Patent [19]

Yamamoto et al.

[11] Patent Number: 5,333,179
[45] Date of Patent: Jul. 26, 1994

[54] FACSIMILE APPARATUS WITH AUTOMATIC ANSWERING TELEPHONE FUNCTION

[75] Inventors: Makoto Yamamoto, Shiga; Kazuaki Oshita, Hirakata; Tetsuya Kuwahara, Shiga, all of Japan

[73] Assignee: Murata Kikai Kabushiki Kaisha, Kyoto, Japan

[21] Appl. No.: 104,941

[22] Filed: Aug. 12, 1993

Related U.S. Application Data

[63] Continuation of Ser. No. 834,972, Feb. 12, 1992, abandoned, which is a continuation of Ser. No. 340,864, Apr. 20, 1989, abandoned.

[30] Foreign Application Priority Data

Apr. 23, 1988 [JP] Japan .................................. 63-100978
Feb. 22, 1989 [JP] Japan ...................................... 1-42593

[51] Int. Cl.⁵ ........................ H04M 1/64; H04M 11/00
[52] U.S. Cl. ............................................ 379/67; 379/80; 379/100
[58] Field of Search ................... 379/100, 88, 67, 98, 379/93, 80; 358/445, 443

[56] References Cited

U.S. PATENT DOCUMENTS

| | | | |
|---|---|---|---|
| 3,873,772 | 3/1975 | Dumler | 379/80 |
| 4,584,434 | 4/1986 | Hashimoto | 379/100 |
| 4,800,439 | 1/1989 | Yoshino | 379/100 X |
| 4,815,121 | 3/1989 | Yoshida | 379/67 |
| 4,939,772 | 7/1990 | Goto | 379/96 |
| 5,022,071 | 6/1991 | Mozer et al. | 379/93 |

FOREIGN PATENT DOCUMENTS

| | | | |
|---|---|---|---|
| 2321219 | 3/1977 | France | 379/93 |
| 0025466 | 2/1984 | Japan | 379/98 |
| 0127472 | 7/1984 | Japan | 379/88 |
| 0148268 | 8/1985 | Japan | 379/100 |
| 0259058 | 12/1985 | Japan | 379/100 |
| 0281655 | 12/1987 | Japan | 379/214 |
| 0051861 | 2/1989 | Japan | 379/100 |
| WO87/07802 | 12/1987 | World Int. Prop. O. | 379/100 |

Primary Examiner—Thomas W. Brown
Attorney, Agent, or Firm—Spensley Horn Jubas & Lubitz

[57] ABSTRACT

A facsimile apparatus with automatic answering telephone function comprising an automatic reception mode to record a voice signal sent from an originating side with a recording unit and the facsimile reception mode to record an image signal sent from the originating side with a sound recording unit, which includes a reception switching mechanism to switch any one mode of the automatic reception mode and facsimile reception mode depending on the kind of a sending signal from the originating side.

1 Claim, 3 Drawing Sheets

FACSIMILE APPARATUS WITH AUTOMATIC ANSWERING TELEPHONE FUNCTION

This is a continuation of application Ser. No. 07/834,972 filed on Feb. 12, 1992 now abandoned, which is itself a continuation of application Ser. No. 07/340,864 filed on Apr. 20, 1989, also abandoned.

FIELD OF THE INVENTION

The present invention relates to a facsimile apparatus with an automatic answering telephone function. Embodiments of the invention comprise an automatic reception mode to record a voice signal sent from an originating side with a recording unit and a facsimile reception mode to record an image signal sent from the originating side with a sound recording unit and particularly to a reception switching mechanism to switch between the automatic reception mode and facsimile reception mode depending on the kind of a sending signal from the originating side.

RELATED ART STATEMENT

A facsimile apparatus with an automatic answering telephone function has already been used. In use, this apparatus preferentially inputs an input signal to the facsimile apparatus as the main function and also functions for conversation or recording by the automatic answering telephone function after the signal which is not intended to the facsimile apparatus has been recognized.

FIG. 4 is a diagram indicating the conventional reception switching system in which, when a calling signal is input to the receiving side device from the originating side device, a predetermined answer message is sent to the originating side device from the receiving side device and a circuit connecting signal (CED) and a digital identification signal (DIS) are transmitted to the originating side device from the receiving side device. The originating side device sends a digital command signal (DCS) when it is a facsimile device and the receiving side device waits for facsimile reception. If the digital command signal (DCS) is not originated to the receiving side device from the originating side device for the telephone to make a conversation with the receiving side device, the originating side device enters a silent condition. FIG. 4 indicates such condition. In the receiving side device, if the signal (DCS) is not input, the digital identification signal (DIS) is sent again and if such silent condition continues, this digital identification signal (DIS) is sent repeatedly. As described the receiving side device sends the digital identification signal (DIS) several times for a no-answer condition in order to confirm it is not the facsimile transmission and the receiving side then switches the operation mode to the automatic answering telephone mode.

However, in the reception switching system employed in the conventional facsimile apparatus with automatic answering telephone function, if the digital command signal (DCS) is not input to the receiving side device after transmission of the digital identification signal (DIS), confirmation that a facsimile signal is not being transmitted is accomplished by sending, several times, the digital signal to the originating side device from the receiving side device. Such a conventional reception switching system has a problem that if a caller of the sending side device hopes to record a message, the caller is requested to wait for a considerable period (usually, 40 seconds to 50 seconds) until connection is established to the telephone line of called party.

OBJECT AND SUMMARY OF THE INVENTION

It is an object of an embodiment of the present invention to provide a facsimile apparatus with an automatic answering telephone function which solves the technical problems described above through judging that the signal is sent from a person when a certain receiving energy is detected, thereby starting the recording to reduce the time a caller is requested to wait.

In view of overcoming the object explained above, an embodiment of the present invention provides a reception switching system in facsimile apparatus with an automatic answering telephone function characterized in that a called station connecting receiver sends a line connection signal and a digital identification signal to an originating side and a timer provided at the receiving side is operated, a signal from the originating side is input to an energy detecting section comprised of a main control section and a modem so that whether the energy value of the received signal exceeds a preset level thereof can be detected within a predetermined time.

Furthermore, an embodiment of the present invention includes a facsimile apparatus with automatic answering telephone function comprising an automatic reception mode to record a voice signal sent from an originating side with a recording unit and a facsimile reception mode to record an image signal sent from the originating side with a recording unit, a receiving energy detecting means which judges the voice of a person by receiving the signal sent from the originating side and detecting distribution status of receiving energy of such receiving signal at the time of handshaking, and a reception mode switching control means which switches the reception mode to the automatic reception mode to start the automatic recording when the voice signal is received, on the basis of the result of judgement by the receiving energy detecting means.

DETAILED DESCRIPTION OF PREFERRED EMBODIMENTS

Figure 1:
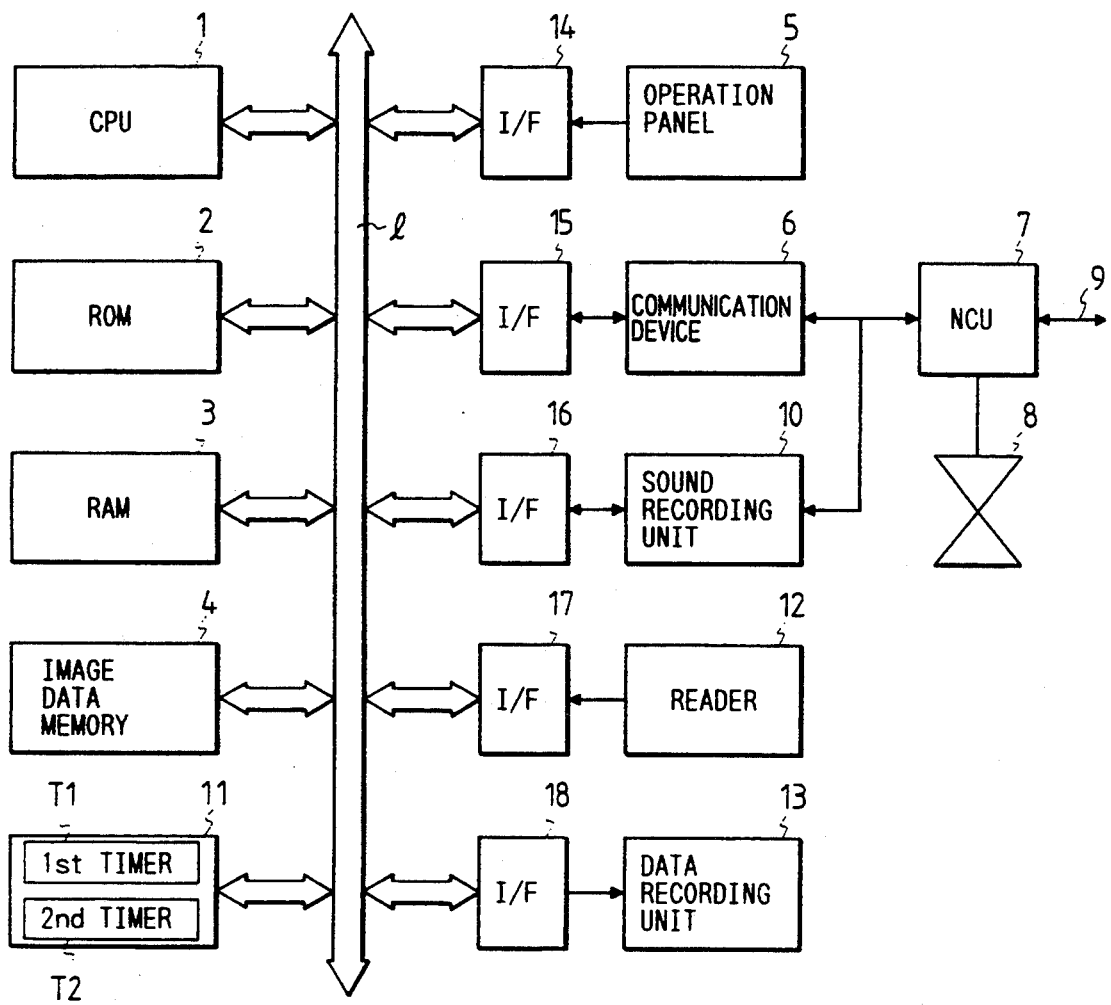
FIG. 1 is a block diagram of an embodiment of a facsimile apparatus with automatic answering telephone function in relation to the present invention.
Figure 4:
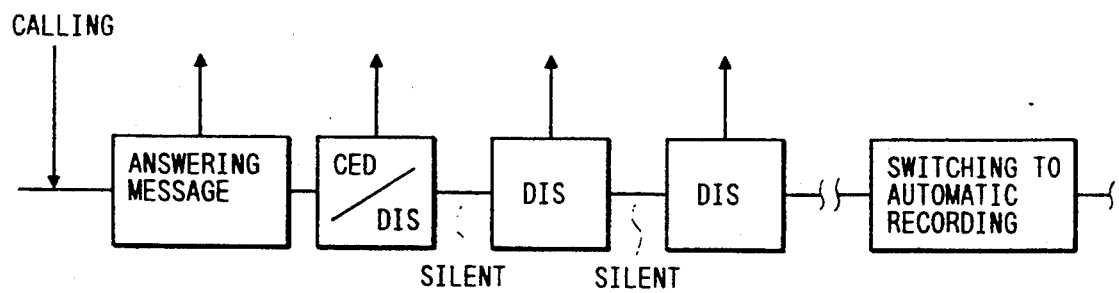
FIG. 4 is a diagram for explaining the reception switching system of the prior art.

FIG. 1 is a block diagram of an embodiment of the facsimile apparatus with automatic answering telephone function in relation to the present invention. A reference numeral 1 designates CPU which is connected, through a common bus line l, individually with ROM 2 having a system program stored, RAM 3 having an answering message stored, an image memory 4 for storing an image data sent from a distant party and a timer circuit 11. This timer circuit 11 includes a first timer T1 and a second timer T2. In the same figure, a reference numeral 5 designates an operation panel having the ten keys and function keys; 6, modem; 7, circuit control apparatus (hereinafter referred to as NCU) for controlling the circuit 9; 10, a sound recording unit such as a tape recorder; 12, a reader for reading a document to be sent; 13, a data recorder for recording received image data. 14, 15, 16, 17, 18 are interfaces. A receiving energy detecting means, which judges a voice signal by detecting distribution of energy of receiving signal, includes CPU 1 and modem 6. CPU 1 has the reception mode switching function, in addition to the ordinary communication control function, to switch the automatic reception mode to record the voice signal sent from the distant party with a recording unit 10 and the facsimile reception mode to record the image signal sent from the distant party with a data recording unit 13.

A first embodiment of the reception switching function for facsimile reception and automatic answering telephone will be explained.

Usually, the facsimile apparatus preferentially receives the facsimile signal. Therefore, when a circuit connection signal (CED), digital identification signal (DIS) or (GC) is transmitted from the receiving side device for the connection of the called station, the receiving side device judges that the facsimile signal is sent from the originating side device and waits for reception of the facsimile signal like the conventional device.

Here it is a problem to decide whether the signal transmitted from the originating side device is for the facsimile or conversation by telephone, on the occasion of reception switching to the automatic answering telephone function. The present invention provides an energy detecting section which detects voices of "hello" as the energy, in place of a signal (DCS) from the originating side device.

This energy detecting section includes CPU 1 and, for example, a 6. The sending energy of voices sent from the originating side device is input as a receiving energy to the energy detecting section. The energy detecting section calculates, for example, the receiving energy and sends such energy to CPU 1 as a value corresponding to such energy. CPU 1 detects such value with a first timer T1 within the predetermined period t1 (for example, 20 seconds in the case of this embodiment). When the value is higher than the preset level, it is judged as voice. Therefore, when the energy detecting section detects the receiving energy, the receiving side device switches the reception mode to the recording unit 10 reliably and easily. In addition, since such predetermined period t1 is set, the reception switching can be carried out within the predetermined period t1.

Here, it is probable that noise on the circuit 9 may be detected erroneously during detection of receiving energy at the energy detecting section. Therefore, the detection level is set, for example, to −36 dBm in this embodiment and if the receiving energy exceeds this preset level (−36 dBm), the energy is judged as the voice energy. Moreover, this preset level is not limited only to the present embodiment.

In a second embodiment, the receiving energy detecting means includes the modem 6 and CPU 1 and judges a voice signal by detecting distribution of energy of receiving signal. The second embodiment will be described in detail hereinafter.

Figure 2:
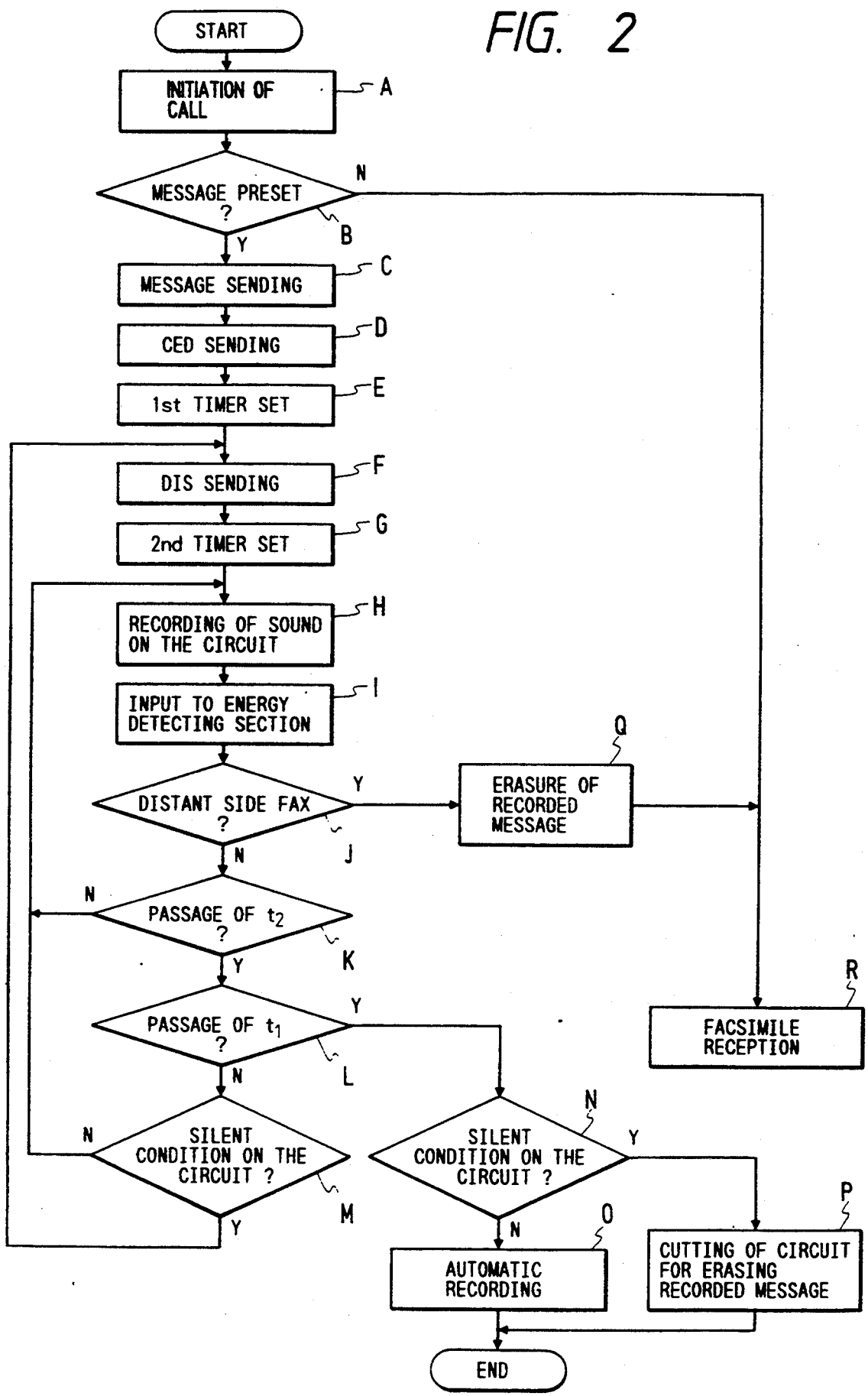
FIG. 2 is a flowchart indicating the reception mode switching operation of a facsimile apparatus with automatic answering telephone function.

FIG. 2 is a flowchart indicating the reception switching operation of the facsimile apparatus with automatic answering telephone function. In the step A, a calling signal from the originating apparatus (facsimile apparatus or telephone set) is input to the facsimile apparatus of the receiving side. In the step B, it is judged whether the answering message is in advance stored in the RAM 3 or not. If NO, operation skips to the step R, a reception mode is switched to the facsimile reception mode. When YES B, operation shifts to the step C from D. The CPU 1 reads the answering message stored in the RAM 3, converts it into the voice signal by sending it to the modem 6 through the interface 15 and then outputs the signal on the circuit 9 through NCU 7.

Next, in the step D, a circuit connecting signal (CED) is transmitted. In the step E, the first timer T1 is reset to the predetermined time t1, for example, to 20 seconds, and is then started. In the step F, a digital identification signal (DIS) or group identification signal (GI) is transmitted. In the step G, the second timer T2 is reset to the predetermined time t2, for example, to 3 seconds, and is then started. After shifting to the step H, the sound on the circuit 9 is recorded by the recording unit 10. Namely, the automatic recording is started. In the step I, the sound on the circuit 9 is input to the receiving energy detecting means in the same way as described. The energy detecting means includes CPU 1 and modem 6 as described, the sending energy sent from the receiving side is input as the receiving energy, the receiving energy is calculated and a corresponding value is guided to CPU 1. In the step S, when the digital command signal (DCS) or group command signal (GC) from the originating apparatus is received by the receiving side, the distant apparatus is judged as the facsimile and operation shifts to the step A. The recorded part of the recording unit 10 is erased. Operation shifts to the step R and the operation mode is switched to the facsimile reception mode.

When NO, in the step J, operation shifts to the step K, wherein the operations of step H→step I→step J→step K are repeated until the time t2 of the second timer T2 passes. When the predetermined time t2 of the second timer T2 passes, operation shifts to the step L from the step K to check the passage of predetermined time t1 by the first timer T1. When NO in the step L, operation shifts to the step M, CPU 1 detects a value 6 to judge fluctuation of receiving energy in the second embodiment. In the first embodiment, CPU 1 detects the value to judge whether the value is higher than the preset level. In case a voice signal is detected, the voice signal level includes fluctuation but a noise signal is detected from less fluctuation of sound level. If the receiving energy is detected, operation shifts to the step H but if the receiving energy is not detected, operation shifts to the step F. During such operation, when the predetermined time t1 by the first timer T1 has passed in the step L, operation shifts to the step N, wherein the receiving energy is identified by the receiving energy detecting means as in the case of the step M. When the receiving energy is detected, namely the voice signal is detected, operation proceeds to the step O and automatic recording by the recording unit 10 is continued. Moreover, when the receiving energy is not detected, namely the signal other than the voice signal or the signal from the apparatus other than the facsimile (for example, corresponding to a personal computer or the like) is detected, operation shifts to the step P, the recorded part of the recording unit 10 is erased and the telephone line is disconnected, completing the operation.

The first embodiment of the present invention identifies the voice signal by comparing the receiving energy from the originating side device with the preset level by the energy detecting section, but such identification may also be done by another method. Namely, the originating side device is instructed to depress a pushbutton of telephone set on the occasion of sending (step C) the answering message from the receiving side device, the pulse signal generated when the button is depressed is detected by the energy detecting section and thereby the originating side device is judged to be a telephone set for conversation and the recording is carried out.

The preset periods t1, t2 by the first timer T1 and the second timer T2 are not only limited such periods and may be changed freely.

As described, in the second embodiment, the reception mode is switched by detecting distribution of receiving energy. Thereby, the automatic recording time can be possibly reduced in comparison with the time of prior art.

Figure 3B:
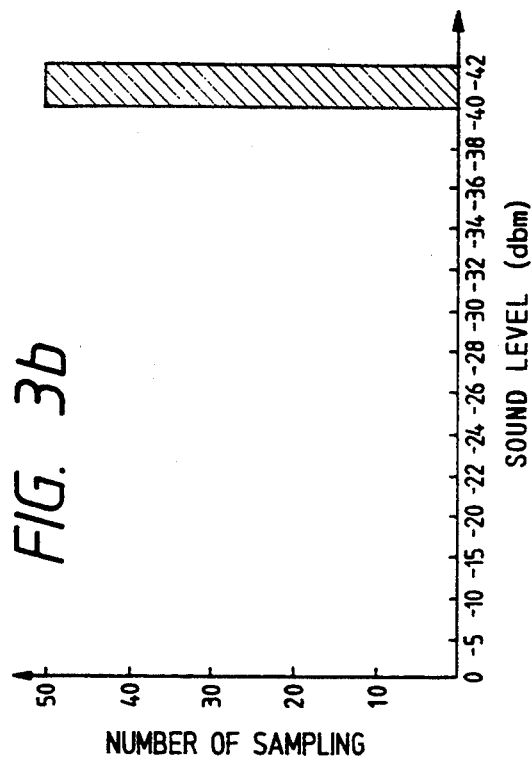
FIGS. 3a to 3d illustrate graphs indicating distributing conditions of receiving energy for the voice signal of person, noise and silent condition.
Figure 3D:
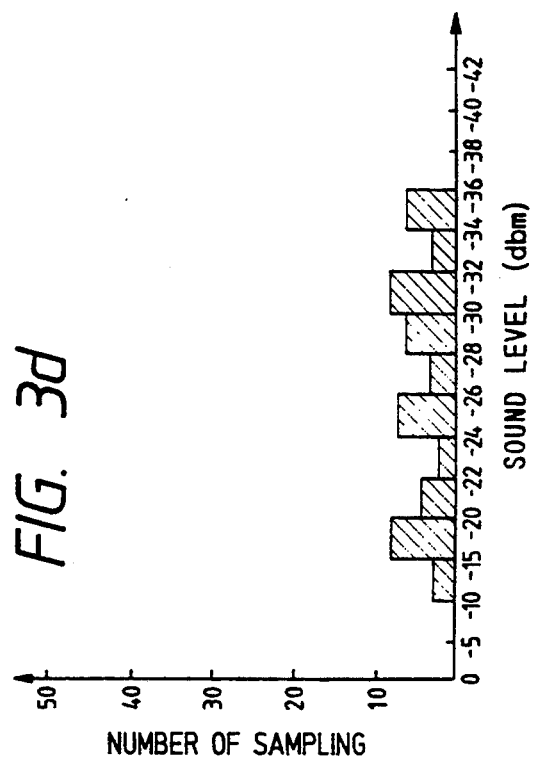
Figure 3A:
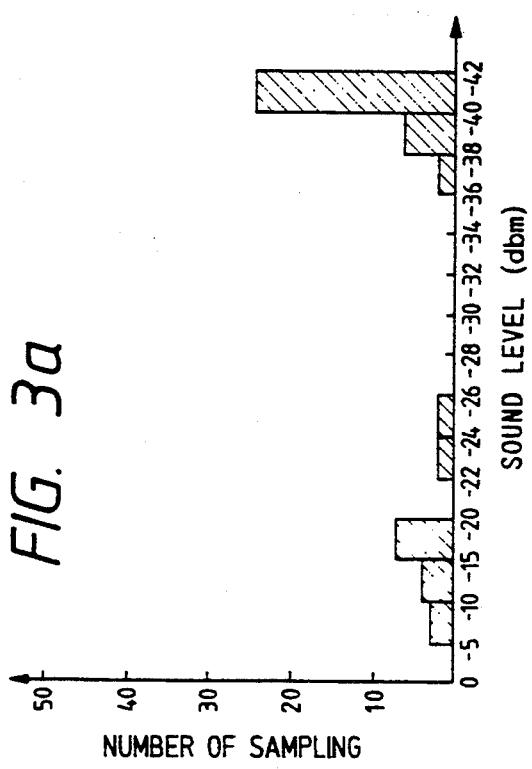
Figure 3C:
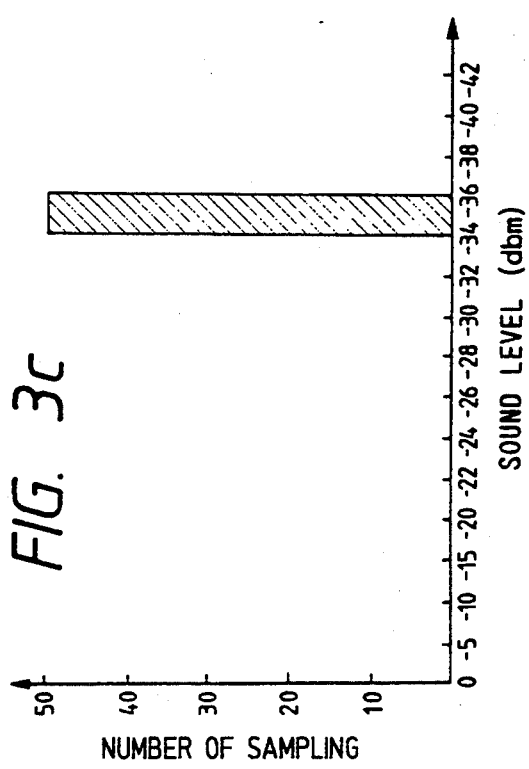

In addition, detection of voice signal using distribution status of receiving energy provides much contribution to improvement of accuracy in comparison with the method using frequency or period employed in the prior art. The reasons may be explained hereunder. For example, FIG. 3a indicates distribution status of receiving energy of voice signal, FIG. 3b indicates that in the silent condition, FIG. 3c indicates that of noise and FIG. 3d indicates that of voice signal on the noise.

In these figures, sound level (dBm) is plotted on the horizontal axis and the number of samplings (N) on the vertical axis.

A received energy corresponding to the sound level on the circuit (voice, noise, silence, etc.) is input to the CPU 1. Input of this receiving energy is executed periodically. CPU 1 reads the input receiving energy value. When it reads the receiving energy value of −16 dBm, for example, CPU 1 judges the receiving energy value in the range from −15 dBm to −19 dBm, adding the area value of −15 ∼ −19 dBm of receiving energy value buffer acquired on the RAM 3. This operation is continuously or intermittently executed and the values of respective areas of receiving energy value buffer acquired on the RAM 3 are changed. Such operations are repeated for several times and thereby an imaginary graph is generated.

If it is assumed that an imaginary graph is generated by repeating N times the sampling of the received energy value input, CPU 1 reads the values of received energy value buffers in RAM 3 and judges the rate of the minimum level of fluctuating received energy distribution of the received energy value, to determine the voice signal, silent condition or noise level. As will be apparent from FIGS. 3a to 3d, level variation and the number of calls corresponding to such level change suggest that the receiving energy level can be detected in a wide region even if such a region is other than the minimum level region when the voice signal is transmitted from the distant apparatus. Moreover, if a voice signal is transmitted, the number of calls of minimum level tends to be decreased in the rate of the total number of calls. Therefore, on judgement of voice signal from the distant apparatus, the voice signal, noise level or silent condition may be judged accurately by considering following two factors: 1 the number of calls of minimum level of the receiving energy distribution occupies a smaller rate but on the contrary a number of calls of the level other than the minimum level occupies a larger rate; 2 the receiving energy can be detected for several points. Sufficient judgement can also be made by considering only one factor.

In the embodiment described above, the receiving energy detecting means includes the modem 6 and CPU 1, but it is also allowed to separately provide individual receiving energy detecting means.

Moreover, when the frequency or period are used, for example, such frequency or period is influenced due to the difference in age, sex or language used and accurate detection is impossible, however, since judgement is made based on the distributing condition of receiving energy for the voice signal to be input, detection can be made based on the characteristics which are common to all persons without influence of age, sex and language used by employing the distributing condition of receiving energy as in the case of the present invention. Accordingly, detection accuracy can be improved.

As described above, according to the second embodiment of the present invention, on the occasion of silent condition during the facsimile training at the time of handshaking, whether the signal sending from the distant side is a voice signal or not is judged by distributing condition of the receiving energy to be input. When a voice signal is received, the automatic recording is started and thereby the time required until the start of automatic recording can possibly be reduced.

What is claimed is:

1. A fax machine for receiving and recording signals from a sending unit, comprising:

voice recorder means defining a voice recorder mode for recording a voice transmission received from the sending unit, fax recorder means defining a fax recorder mode for recording a fax transmission received from the sending unit, energy detection means for detecting the energy level of a signal received from the sending unit a plurality of times and for generating a corresponding energy distribution, wherein each of the plurality of detected energy levels is associated with one of a plurality of energy ranges, and switching means, in communication with the energy detection means, for switching the fax machine from the fax recorder mode to the voice recorder mode when the energy of a signal received from the sending unit corresponds to a predetermined energy distribution.

* * * * *